United States Patent
Barthel et al.

(10) Patent No.: US 8,641,092 B2
(45) Date of Patent: Feb. 4, 2014

(54) VALVE DEVICE AND AIRBAG COMPRISING SUCH A VALVE DEVICE, AND METHOD FOR OPERATING SUCH A VALVE DEVICE

(75) Inventors: Nico Barthel, Kaiserslautern (DE); Ralf Bogenrieder, Stuttgart (DE); Christian Burczyk, Stuttgart (DE); Andreas Hirth, Dielheim (DE); Lutz Quarg, Boeblingen (DE); Friedrich Reiter, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 13/578,454

(22) PCT Filed: Jan. 27, 2011

(86) PCT No.: PCT/EP2011/000356
§ 371 (c)(1),
(2), (4) Date: Oct. 9, 2012

(87) PCT Pub. No.: WO2011/098219
PCT Pub. Date: Aug. 18, 2011

(65) Prior Publication Data
US 2013/0020790 A1     Jan. 24, 2013

(30) Foreign Application Priority Data
Feb. 13, 2010  (DE) ................. 10-2010-007-880

(51) Int. Cl.
*B60R 21/239* (2006.01)
(52) U.S. Cl.
USPC .......................................... 280/742; 280/736
(58) Field of Classification Search
USPC ................................................ 280/742, 736
See application file for complete search history.

(56) References Cited

U.S. PATENT DOCUMENTS

| 3,970,328 | A  | * | 7/1976  | Wallsten ........................ 280/731 |
| 3,994,506 | A  | * | 11/1976 | Weman ........................ 280/738 |
| 4,126,325 | A  | * | 11/1978 | Weman ........................ 280/738 |
| 5,901,979 | A  | * | 5/1999  | Schneider et al. ............ 280/738 |
| 7,681,914 | B2 | * | 3/2010  | Maidel et al. .................. 280/739 |
| 7,770,923 | B2 | * | 8/2010  | Woo ................................ 280/741 |
| 8,403,362 | B2 | * | 3/2013  | Baumann et al. ............. 280/739 |
| 2009/0218797 | A1 | * | 9/2009 | Perez Garcia ................ 280/742 |
| 2013/0049337 | A1 | * | 2/2013 | Bogenrieder et al. ..... 280/743.1 |

FOREIGN PATENT DOCUMENTS

| DE | 20 2004 002 760 U1 | 6/2004 |
| DE | 10 2004 042 209 A1 | 5/2006 |
| DE | 10 2006 059 311 A1 | 6/2008 |
| DE | 10 2007 014 402 A1 | 10/2008 |

OTHER PUBLICATIONS

Form PCT-ISA-237, Aug. 14, 2012, pp. 1-5.*
International Search Report with English translation dated May 23, 2011 (four (4) pages).
Form PCT/ISA/237 (six (6) pages).

* cited by examiner

*Primary Examiner* — James English
(74) *Attorney, Agent, or Firm* — Crowell & Moring LLP

(57) ABSTRACT

A valve mechanism for a gaseous medium of an airbag is provided. The valve mechanism includes a first and second layer, which respectively include a passage opening that is substantially closed in a closed position of the valve mechanism by a corresponding cover region of the other respective layer. An adjusting element in the form of a tube with an adjustable volume provides a temporary passage position of the valve mechanism by lifting one of the cover regions of the corresponding layer from the corresponding passage opening.

12 Claims, 8 Drawing Sheets

VALVE DEVICE AND AIRBAG COMPRISING SUCH A VALVE DEVICE, AND METHOD FOR OPERATING SUCH A VALVE DEVICE

BACKGROUND AND SUMMARY OF THE INVENTION

The invention relates to a valve mechanism for a medium, in particular for a gaseous medium of an airbag and a method for operating such a valve mechanism.

Protective means comprising airbags are known. These airbags constitute protective means that can be inflated with air and unfold in case of an accident-related force impact of the motor car, thereby protecting the occupants from collision with, for example, the steering wheel or side inner regions of the motor car. Furthermore, airbags with lattice-like structures are known, wherein smaller volumes are to be filled with air. These lattice-like structures form an inner chamber that is optionally surrounded by a shell, into which ambient air must flow as rapidly as possible in order to achieve a very good protective effect.

Exemplary embodiments of the present invention provide a valve mechanism for a medium, in particular for a gaseous medium of an airbag, an airbag and a method for operating a valve mechanism for a medium, in particular for a gaseous medium of an airbag, which facilitate a particularly rapid through-flow or inflow of the medium.

A valve mechanism according to exemplary embodiments of the present invention for a medium, in particular for a gaseous medium of an airbag, comprises a first layer and a second layer that respectively comprise at least one passage opening, the passage openings being at least substantially closed, in a closed position of the valve mechanism, by a corresponding cover region of the other respective layer. The valve mechanism according to the invention also comprises at least one adjusting element, in particular a tube element that can be adjusted in its volume, by means of which, in an at least temporary passage position of the valve mechanism, at least one of the cover regions of the corresponding layer can be lifted at least in areas from the corresponding passage opening. Accordingly, the respective cover region and optionally adjacent regions of the corresponding layer can be lifted from the passage opening to be covered in the closed position of the valve mechanism and possibly from adjacent regions, whereby in the corresponding flow direction of the medium the medium can flow through the valve mechanism or the passage openings particularly well.

If, for example, the adjusting element is the tube element that can be adjusted in its volume, the lifting can be managed by, for example, enlarging the volume of the tube element, in particular by inflation, from a first position, in which it has a minimum volume and possibly an at least substantially equal thickness to that of the corresponding layer. This volume enlargement can thereby take place using, for example, an explosion-like gas discharge, with which the tube element is impacted. Due to the fact that the layers overlap at least in areas, the lifting arises through the volume enlargement of the tube element, whereby the passage openings and thus the valve mechanism can be flowed through particularly well, i.e., in a particularly short time with a particularly high mass or quantity of the medium.

The invention also includes an airbag with an inventive valve mechanism. As described above, such an airbag is a means that must carry out a particularly large volume enlargement in a particularly short time so as to offer maximum protection for occupants of a motor car, thus so that the occupants do not collide with components of the motor car, for example with the steering wheel. The inventive valve mechanism thereby facilitates a particularly rapid filling of a corresponding inner space and/or a container, in particular an air sack, of the airbag with the medium, in particular with air, whereby the airbag can carry out a particularly high volume enlargement in a particularly short time period in order to maximize the protection of the occupants.

Such an airbag is, for example, a so-called lattice-like bag, whereby it is not a very large airbag but instead merely a lattice-like structure of tube elements that is inflated, whereby this lattice-like structure advantageously comprises in its total volume a lower volume to be filled with the medium, in particular air, than a very large airbag which must be filled with the medium, in particular air. The lattice-like structure and the large airbag thereby have the same outer dimensions. They thus occupy an equal volume of the inner space of the motor car. If the volume of the lattice-like bag to be filled is lower than the volume to be filled in the conventional, very large airbag with the same volume of the inner space of the motor car being taken up, the lattice-like bag offers the advantage that, with the same support area or with the same support space, it can be enlarged, in particular inflated, in a shorter time to a desired maximum volume.

The lattice-like structure of such a lattice-like airbag is provided achieve an optimal support effect, for example with a shell, in particular a fabric or similar, whereby the inner space of the lattice-like bag delimited by the lattice-like structure and this shell or similar must be filled with the medium, in particular with ambient air. If the valve mechanism according to the invention in used in the lattice-like bag and the shell or similar, the lattice-like structure is formed for example through the adjusting element, in particular through the tube element which can be adjusted in volume, of the valve mechanism and the shell or similar is formed by the at least two layers of the valve mechanism. Therefore, a large mass of the medium, in particular ambient air, can flow through the layers or the passage openings thereof into the inner space and thus guarantee a particularly rapid volume enlargement of the lattice-like bag and a particularly good supporting effect due to the air in the inner space.

In a particularly advantageous embodiment of the invention at least one of the cover regions is formed by the adjusting element, in particular the tube element that can be adjusted in volume. This increases the degree of function fulfillment of the adjusting element, as the valve mechanism fulfils the task of activating the valve mechanism and closing, thus sealing, the at least one passage opening and preventing passage of the medium through this passage opening.

The inventive valve mechanism has a very high surface area efficiency and a very high robustness that facilitates a particularly high functional reliability of the valve mechanism and thus of the airbag. It should be noted at this point that the inventive valve mechanism and the activation of the valve mechanism through the adjusting element can be applied to a multitude of applications, in which a valve mechanism is necessary. The inventive valve mechanism thereby facilitates optimal adaptability to different requirements of the respective application.

In the inventive valve mechanism the adjusting element, in particular the tube element which can be adjusted in volume, or possibly a tube structure formed from a plurality of such tube elements, is a constituent part of the valve mechanism and thus improves not only the surface area efficiency and the robustness but also the manufacturability of the valve mechanism. This goes hand-in-hand with cost-effective production and thus low total costs for the inventive valve mechanism.

The first layer and/or the second layer is/are formed, for example, at least substantially from a fabric, wherein the first layer is formed, for example, as a supporting fabric and has two layer elements, through which the adjusting element, in particular the tube element which can be adjusted in volume, is formed. The first and/or the second layer is/are, for example, at least substantially impermeable to the medium.

It should be noted that advantageous embodiments of the inventive valve mechanisms are to be regarded as advantageous embodiments of the airbag according to the invention and vice versa.

Furthermore the invention includes a method for operating a valve mechanism for a medium, in particular for a gaseous medium of an airbag, with a first layer and a second layer that respectively comprise at least one passage opening, the passage openings being at least substantially closed, in a closed position of the valve mechanism, by a corresponding cover region of the other respective layer. The valve mechanism also comprises at least one adjusting element, in particular a tube element that can be adjusted in volume, by means of which, in an at least temporary passage position of the valve mechanism, at least one of the cover regions of the corresponding layer is raised at least in areas from the corresponding passage opening. Advantageous embodiments of the inventive valve mechanism are to be regarded as advantageous embodiments of the method according to the invention and vice versa. The method according to the invention thus allows a through-flow of the valve mechanism by a particularly high mass or quantity of the medium in a particularly short time, which leads in case of the airbag described advantageously to a particularly rapid volume enlargement thereof.

Further advantages, features and details of the invention follow from the following description of a plurality of preferred embodiments and by reference to the drawings. The features and feature combinations mentioned above in the description and the features and feature combinations mentioned below in the description of the drawings and/or shown solely in the drawings can be used not only in the respectively indicated combinations but also in other combinations or alone without going outside of the scope of the invention.

DETAILED DESCRIPTION

Figure 1:
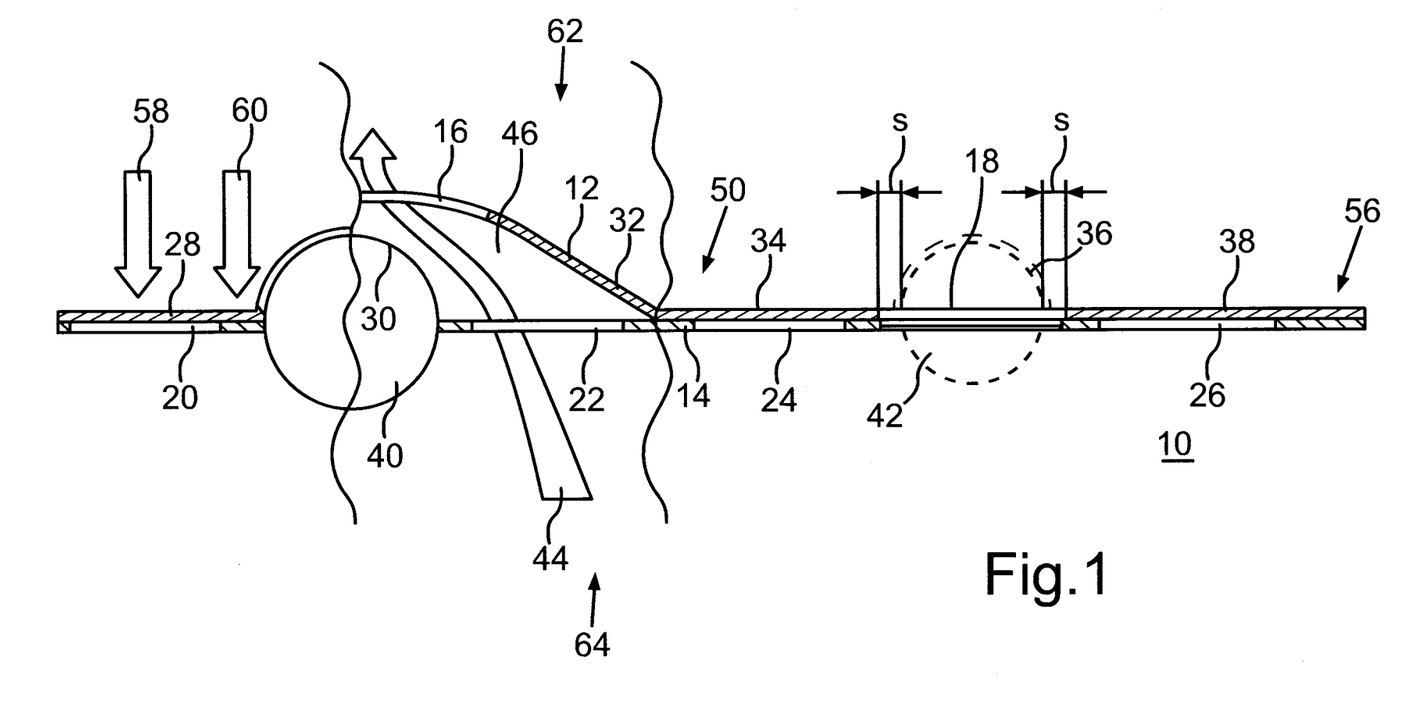
FIG. 1 a schematic sectional view of an embodiment of the valve mechanism according to the invention.

FIG. 1 shows a valve mechanism 10 for a gaseous medium of an airbag with a first layer 12 and a second layer 14 which respectively comprise passage openings 16 and 18/20, 22, 24, and 26. The passage openings 16, 18, 20, 22, 24, and 26 are closed in a closed position of the valve mechanism 10 by a corresponding cover region 28, 30, 32, 34, 36 and 38 of the other respective layer 12 or 14. The layers 12 and 14 are formed as fabric layers.

Furthermore, the valve mechanism 10 comprises adjusting elements in the form of tube elements 40 and 42, which can be adjusted in volume, by means of which, in an at least temporary passage position of the valve mechanism 10, at least one of the cover regions 28, 30, 32, 34, 36, and 38 of the corresponding layer 12 or 14 can be lifted at least in areas from the corresponding passage opening 16, 18, 20, 22, 24, and 26.

As can be seen in FIG. 1, the cover regions 30 and 36 are respectively formed by the tube element 40 or 42. The function of the valve mechanism 10 can be understood with reference to the tube element 40. The tube element 40 is shown in its inflated position, in which it takes up a larger volume than in its non-inflated position, which is shown through the tube element 42. It can thereby be brought from the non-inflated position into the inflated position through a gas impact, by means of which the tube element 40 or 42 is enlarged in its volume. The valve mechanism 10 is thereby active when the tube element 40 or 42 is inflated and inactive when the tube element 40 or 42 is not inflated. A valve inner space 46 is enlarged on a large scale through the volume enlargement of the tube elements 40 or 42. The tube elements 40 and 42 are therefore used not only to seal or close the corresponding passage openings 16 and 18, and thus as sealing elements, but also as path indicating elements for the enlargement of the valve inner space 46.

The layer 14 comprises two fabric layer elements for the formation of the tube elements 40 and 42. The layer 14 is laid over the layer 12, and layer 12 is connected in intermediate areas 50 and 56 to the layer 14.

The valve mechanism 10 is used, for example, with a so-called lattice-like bag, whereby it is an airbag, in which a lattice-like structure is inflated, the lattice-like-structure is formed from a plurality of tube elements like the tube elements 40 and 42. This lattice-like structure delimits an inner space and is provided with the layers 12 and 14, whereby in case of unfolding of the lattice-like structure the inner space must be filled via the layers 12 and 14 with air, in particular ambient air, in order to facilitate a supporting effect which is as optimal as possible for the protection of occupants of a motor car with such a lattice-like bag. The valve mechanism 10 facilitates a particularly rapid inflation of the lattice-like bag and thus a particularly rapid penetration of a high mass of the air according to a direction arrow 44. It should be noted that a side 62 of the valve mechanism faces the inner space of the lattice-like structure and a side 64 corresponds to an outer side of the lattice-like bag, thus facing the inner space of the motor car.

In case of the motor car being involved in an accident that requires volume enlargement of the airbag, thus the triggering thereof, the tube elements 40 and 42 or the lattice-like structure are inflated and air can flow through the passage openings 16, 18, 20, 22, 24, and 26 into the inner space according to the direction arrow 44. Outflow of the air from the inner space according to the direction arrows 58 and 60 is avoided because (as shown using the cover regions 28 and 30 and the passage openings 16 and 20) the cover region 28 covers the passage opening 20 and the cover region 30 covers the passage opening 16, whereby the passage opening 16 is covered in that it lies against corresponding wall regions of the tube element 40.

In FIG. 1 "s" designates a material shortening in the region of the tube elements 40 and 42 through the volume enlargement in the form of the inflation thereof, whereby this results in an excess length of the movable cover regions 28, 32, 34 and 38 of the movable layer 12.

Figure 5:
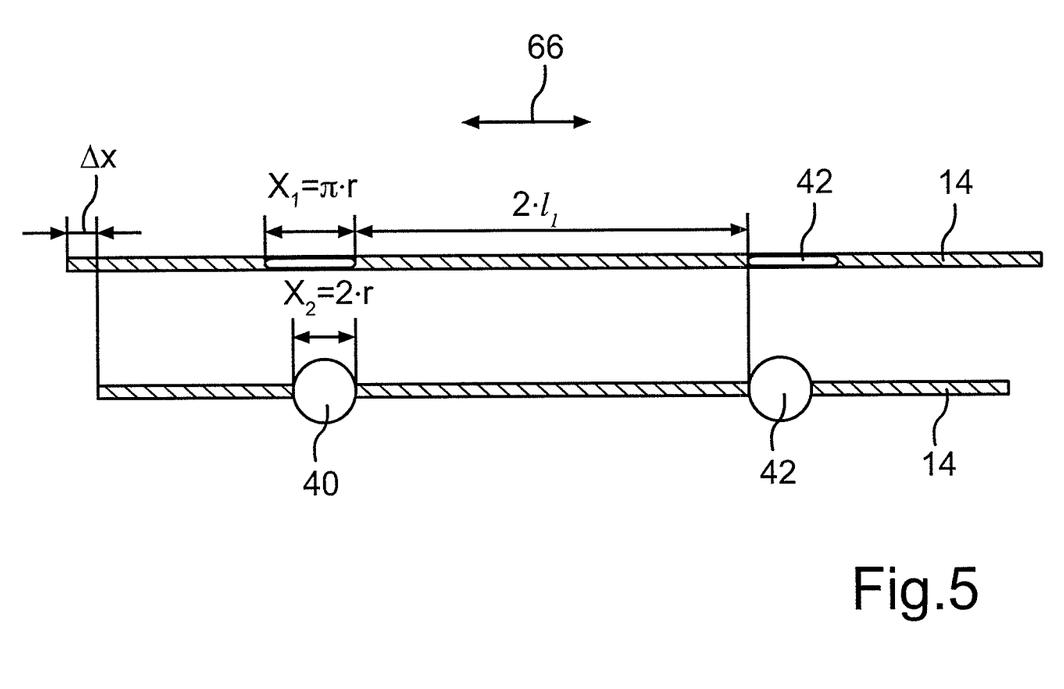
FIG. 5 two schematic sectional views of an embodiment of the valve mechanism according to the invention.
Figure 6:
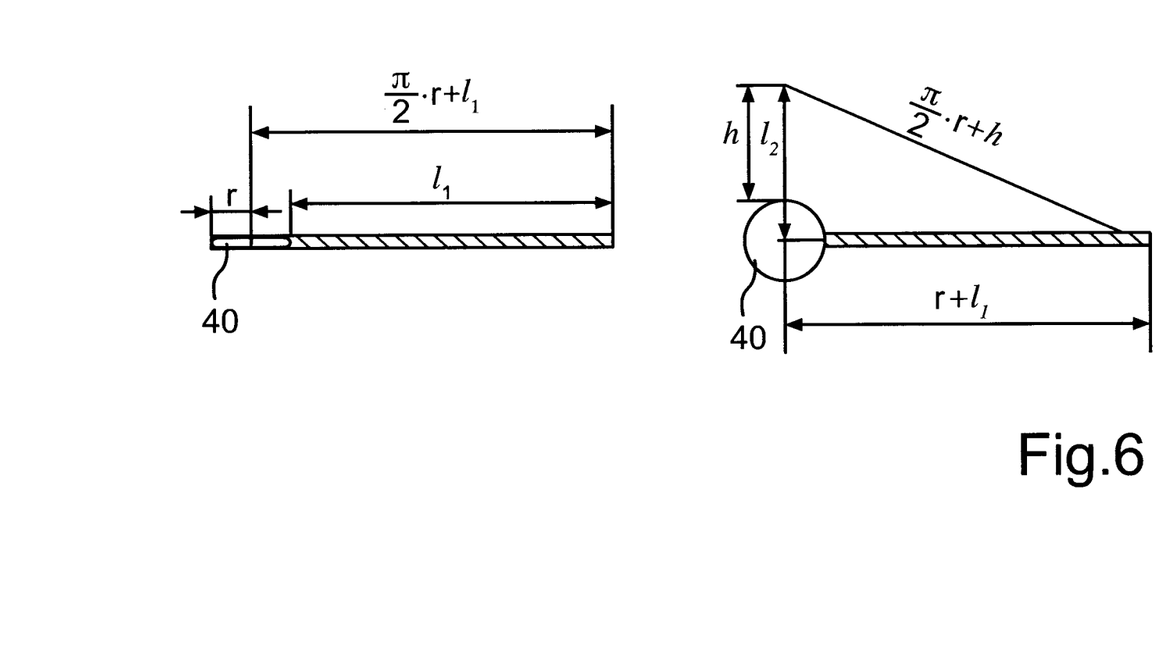
FIG. 6 two schematic sectional views of an embodiment of the valve mechanism according to the invention.

This is shown using FIGS. 5 and 6. If one compares the layer 14 in the non-inflated state of the tube elements 40 and 42 according to the top illustration of FIG. 5, in which the length according to a direction arrow 66 of the layer 14 substantially coincides with the length of the layer 16, with the inflated state of the tube elements 40 and 42 according to the bottom illustration in FIG. 5, one can see that the layer 14 is shortened upon inflation of the tube elements 40 and 42 and indeed on the one hand by the length amount Δx, which corresponds to the material shortening s according to FIG. 1. A width $x_1$ at the position of the tube elements 44 and 42 of the layer 14 corresponds in the non-inflated state of the tube elements 40 and 42 to half the circumference of the inflated tube elements 40 and 42. This thus results in the following correlation for the width $x_1$:

$$x_1 = \pi \cdot r.$$

In the inflated state of the tube elements 40 and 42 the width $x_1$ reduces to a new width $x_2$, which corresponds to twice the radius of one of the tube elements 40 and 42. $x_2$ thus results:

$$x_2 = 2 \cdot r,$$

wherein r describes the radius of one of the tube elements 40 and 42. This results in the following path gain for each tube element 40 or 42:

$$\Delta x = x_1 - x_2 = \pi \cdot r = \pi - 2 \cdot r.$$

The moving layer 12, which is formed in the flat, non-sewn state of the layer 14 forming an air sack of the lattice-like bag, is laid over this and fixed at points in the intermediate surfaces 50 and 56. The layer 12 and the non-sewn layer 14 thus have the same length. The path gain upon filling the tube elements 40 and 42, thus in case of volume enlargement thereof, in a respective plane of the respective layer 12 or 14 is available to the layer 12 in perpendicular direction to the plane of the layers 12 or 14 for the enlargement of the valve inner space 46. This is shown in FIG. 6. If one assumes that the layer 16 stretches like a triangle between point-based fixing of the two layers 12 and 14, a distance h between an upper edge of the tube elements 40 or 42 and the layer 14 can be calculated as follows:

$$h = l_2 - r = \sqrt{\left(\frac{\pi}{2} \cdot r + l_1\right)^2 - (r + l_1)^2} - r,$$

wherein $l_2$ describes the distance between the middle point of the tube element 40 or 42 to the layer 16. $l_1$ describes half the distance between the tube elements 40 and 42. It should be noted that this is shown in FIG. 6 using the tube element 40, wherein the tube element 40 is shown on the right side in FIG. 6 in its non-inflated state and on the right side in FIG. 6 in its inflated state. The indications concerning the tube element 40 also apply to the tube element 42.

Figure 2:
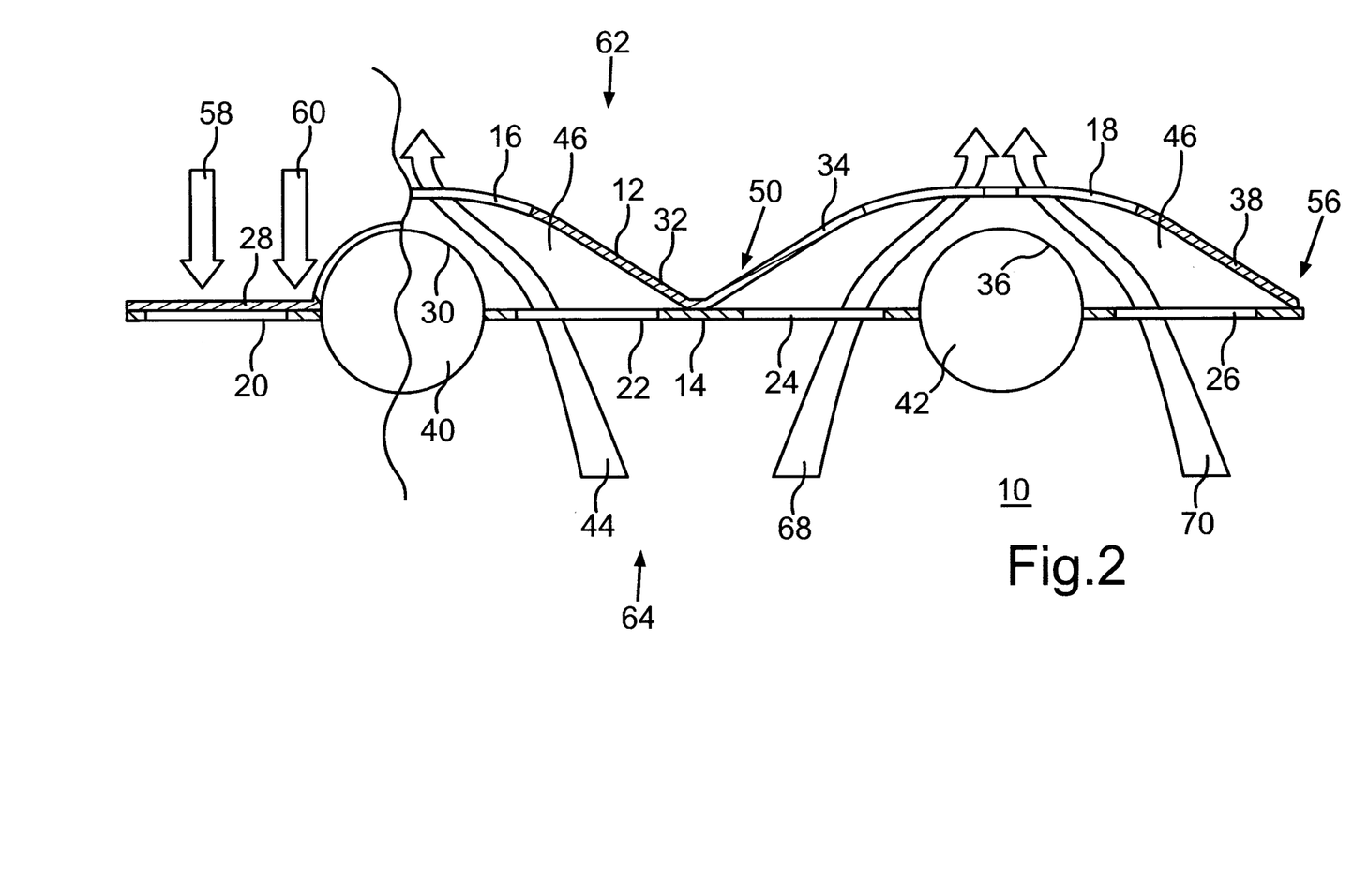
FIG. 2 a further schematic sectional view of the valve mechanism according to FIG. 1.

FIG. 2 shows the valve mechanism 10 according to FIG. 1, wherein the indications concerning the valve mechanism 10 according to FIG. 1 apply similarly to the valve mechanism 10 according to FIG. 2. In the valve mechanism 10 according to FIG. 2 the tube element 42 is inflated and allows air to flow through the valve mechanism 10 and thus into the inner space of the lattice-like bag according to direction arrows 68 and 70. It should be noted that in case of an accident-related force impact of the motor car requiring unfolding and thus activation of the lattice-like bag with the valve mechanism 10, possibly all available tube elements such as the tube elements 40 and 42 are enlarged in their volume, thus inflated. It is also possible to only inflate a partial number of the tube elements in order to carry out unfolding and activation of the lattice-like bag according to requirements depending on an accident situation. The inflation of the tube elements can thereby take place, for example, depending on a direction in which the accident-related force impact takes place, and require the inflation of different and possibly not all tube elements. An inflation of the tube elements or a partial number of the tube elements, offset in time, is also possible.

Figure 3:
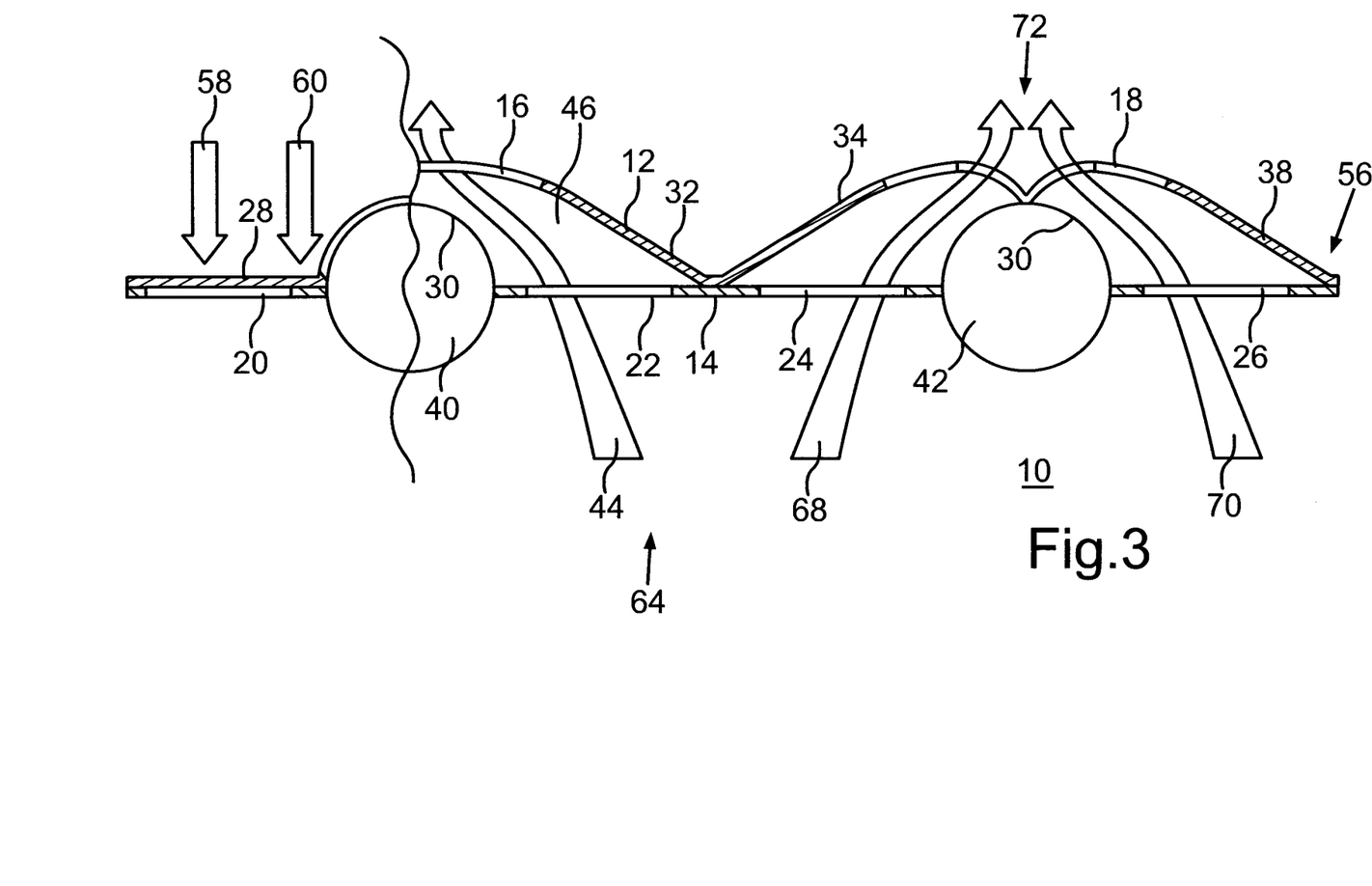
FIG. 3 a schematic sectional view of a further embodiment of the valve mechanism according to the invention.

FIG. 3 shows an alternative embodiment of the valve mechanism 10, wherein in FIG. 3 the layer 12 is connected in a middle region 72 of the passage opening 18 to the tube element 42. In other respects the indications made in relation to the valve mechanism 10 according to FIGS. 1 and 2 apply similarly to the valve mechanism according to FIG. 3.

Figure 4:
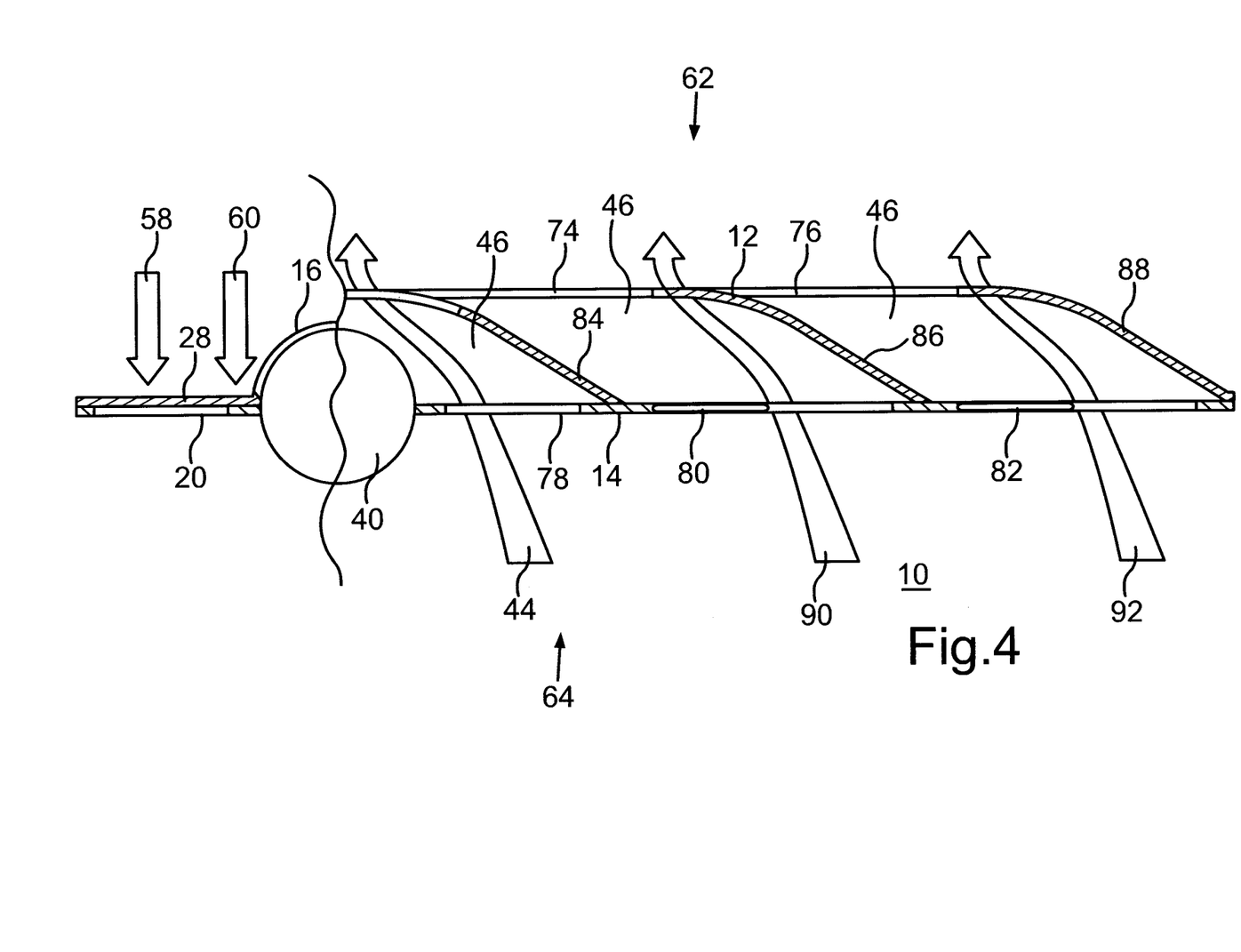
FIG. 4 a schematic sectional view of a further embodiment of the valve mechanism according to the invention.

FIG. 4 shows a further alternative embodiment of the valve mechanism 10, wherein a plurality of passage openings 74 and 76 of the layer 12 and passage openings 78, 80 and 82 of the layer 14, with corresponding cover regions 84, 86 and 88 closing the passage openings 74, 76, 78, 80, 82, connect to the tube element 40, which is shown in FIG. 4 in its inflated state. The inflation of the tube element 40 thereby leads in turn to an enlargement of the valve inner spaces 46, through which air can flow via the corresponding passage openings 16, 74, 76, 78, 80 and 82 according to direction arrows 44, 90 and 92.

Figure 7:
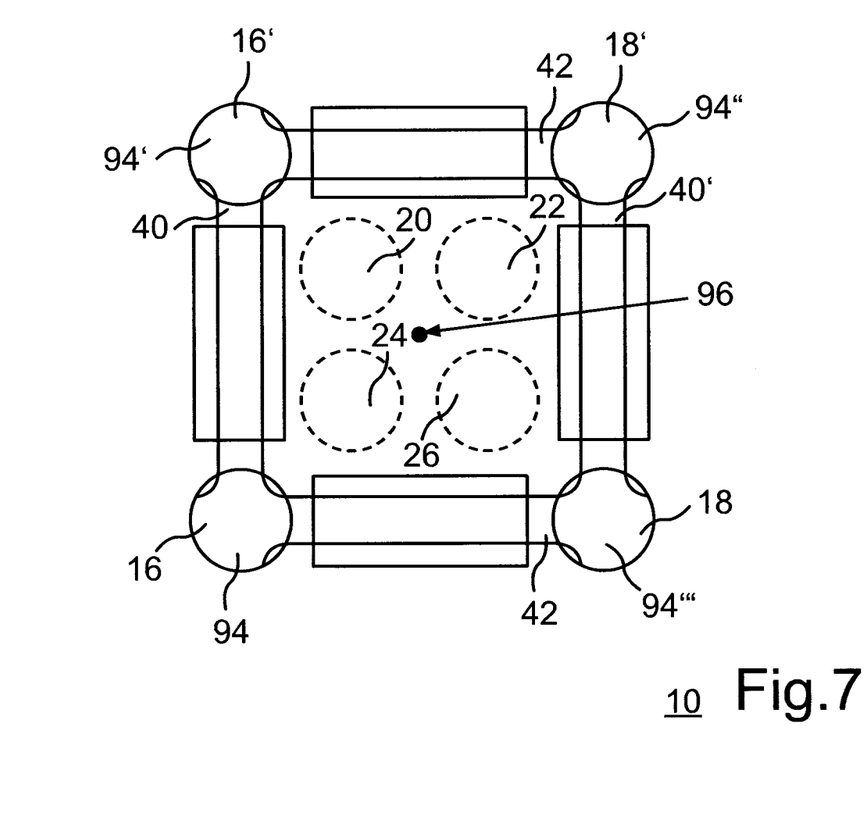
FIG. 7 a schematic top view of an embodiment of the valve mechanism according to the invention.

FIG. 7 shows a top view of an embodiment of the valve mechanism 10, wherein the plurality of tube elements 40, 40', 42 and 42' can be derived from FIG. 7, which are connected to each other with fluid communication by means of common node points 94, 94', 94", and 94'". The movable layer 12 is connected at points to the layer 14 in a region 96. The passage openings 20, 22, 24 and 26 of layer 14, shown in dotted lines in FIG. 7, are also described as ventilation holes of the layer 14, thus of the airbag. Also shown in FIG. 7 are the passage holes 16 and 18 and passage holes 16' and 18' of the movable layer 12. The passage openings 16, 16' 18, 18', 20, 22, 24, and 26 can have any form. Advantageously the movable layer 14 is cut out in the region of the node points 94, 94', 94", and 94'" in order to avoid creasing in case of sealing of the adjacent layer 12.

Figure 8:
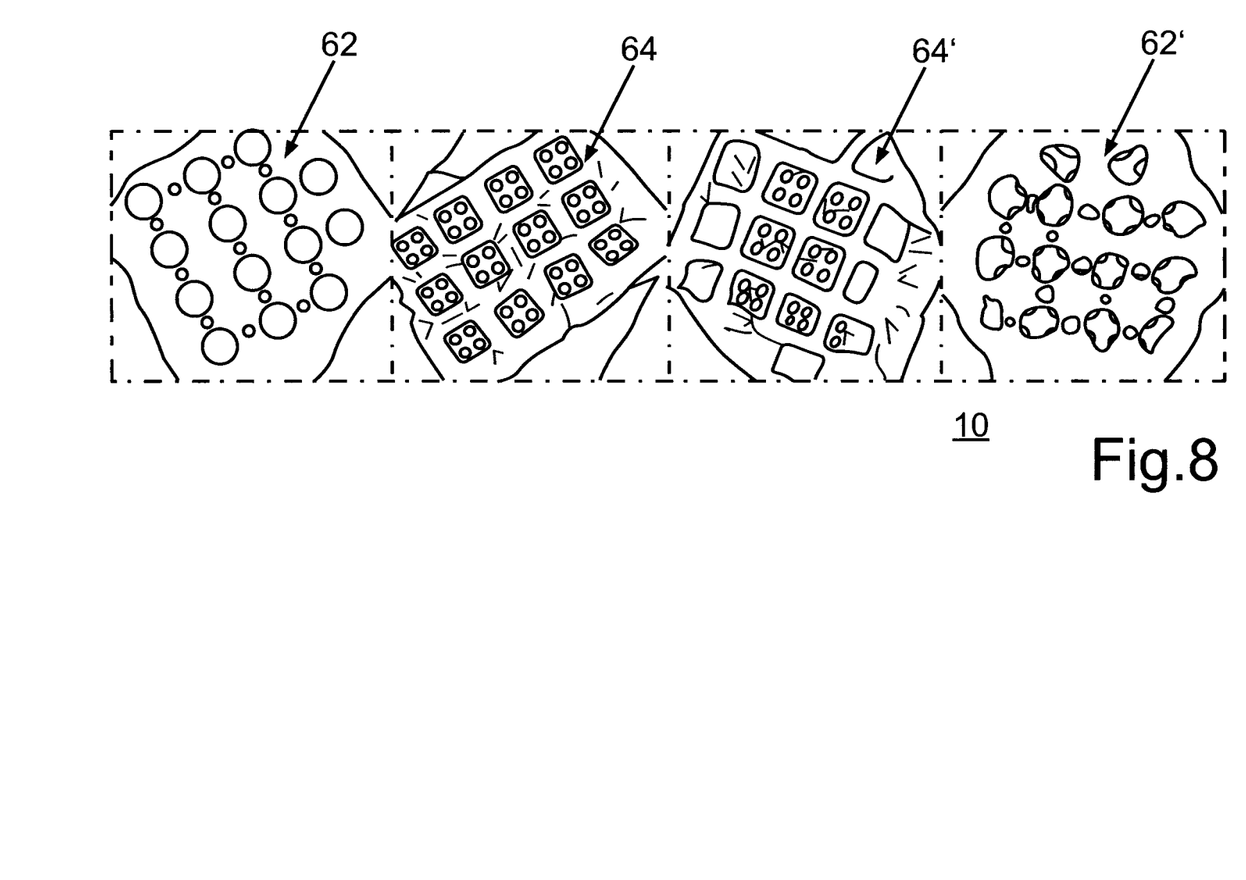
FIG. 8 four perspective views of an embodiment of the valve mechanism according to the invention.

FIG. 8 shows an implementation of the valve mechanism 10 shown in FIG. 7, wherein the inner side 62 of the valve mechanism 10 can be derived from FIG. 8 and wherein the tube elements 40 and 42 are not impacted with air or with compressed air. Also shown in FIG. 8 is the outer side 64 of the valve mechanism 10, wherein the tube elements 40 and 42 are also not impacted with compressed air. The reference numeral 64' describes the outer side 64 of the valve mechanism 10, wherein the tube elements 40 and 42 are now indeed impacted with compressed air. The reference numeral 62' describes, similarly, the inner side 62 of the valve mechanism 10, wherein the tube elements 40 and 42 are likewise impacted with compressed air.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A valve mechanism for a gaseous medium of an airbag, the valve mechanism comprising:
   a first layer that includes at least one passage opening;

a second layer that includes at least one passage opening; and an adjusting element in the form of a tube with an adjustable volume, wherein the at least one passage openings of the first and second layers are configured so as to be at least substantially closed in a closed position of the valve mechanism by a corresponding cover region of the other layer, wherein the tube adjusting element is configured so that expansion of the adjustable volume of the tube adjusting element pushes the tube adjusting element against and lifts at least one of the cover regions of the corresponding layer, at least in areas from the corresponding passage opening, in an at least temporary passage position of the valve mechanism, and wherein the first layer or the second layer is formed at least substantially from a fabric.

2. The valve mechanism according to claim 1, wherein at least one of the cover regions is formed by the tube adjusting element, which has an adjustable volume.

3. The valve mechanism according to claim 1, wherein the first layer is formed as a supporting fabric and comprises two layer elements, through which the tube adjusting element is formed.

4. The valve mechanism according to claim 1, wherein the first or second layer is at least substantially by the medium impenetrable.

5. The valve mechanism according to claim 1, comprising:
at least two tube adjusting elements, which are configured in fluid communication with each other by at least one common node point and are adjustable in their volume, wherein the second layer comprises a free section in a region of the at least one common node point.

6. The valve mechanism according to claim 1, wherein the first layer is connected to the second layer by a sewn connection.

7. An airbag, comprising:
a valve mechanism, which includes
a first layer that includes at least one passage opening;
a second layer that includes at least one passage opening; and an adjusting element in the form of a tube with an adjustable volume, wherein the at least one passage openings of the first and second layers are configured so as to be at least substantially closed in a closed position of the valve mechanism by a corresponding cover region of the other layer, wherein the tube adjusting element is configured so that expansion of the adjustable volume of the tube adjusting element pushes the tube adjusting element against and lifts at least one of the cover regions of the corresponding layer, at least in areas from the corresponding passage opening, in an at least temporary passage position of the valve mechanism, and wherein the first layer or the second layer is formed at least substantially from a fabric.

8. The airbag according to claim 7, wherein at least one of the cover regions is formed by the tube adjusting element, which has an adjustable volume.

9. The airbag according to claim 7, wherein the first layer is formed as a supporting fabric and comprises two layer elements, through which the tube adjusting element is formed.

10. The airbag according to claim 7, wherein the first or second layer is at least substantially impenetrable by a gaseous medium.

11. The airbag according to claim 7, comprising:
at least two tube adjusting elements, which are configured in fluid communication with each other by at least one common node point and are adjustable in their volume, wherein the second layer comprises a free section in a region of the at least one common node point.

12. The airbag according to claim 7, wherein the first layer is connected to the second layer by a sewn connection.

* * * * *